(12) United States Patent
Choi (10) Patent No.: US 9,663,152 B2
(45) Date of Patent: May 30, 2017

(54) STRUCTURE FOR MOUNTING FRONT CABIN IN TRUCK

(71) Applicant: HYUNDAI MOTOR COMPANY, Seoul (KR)

(72) Inventor: Kyoon Choi, Jeonju-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/863,443

(22) Filed: Sep. 23, 2015

(65) Prior Publication Data

US 2016/0121939 A1 May 5, 2016

(30) Foreign Application Priority Data

Nov. 5, 2014 (KR) .................. 10-2014-0152827

(51) Int. Cl.
*B62D 33/063* (2006.01)
*B62D 33/06* (2006.01)
*B62D 33/067* (2006.01)

(52) U.S. Cl.
CPC ....... *B62D 33/0604* (2013.01); *B62D 33/063* (2013.01); *B62D 33/067* (2013.01)

(58) Field of Classification Search
CPC .... B62D 33/06; B62D 33/063; B62D 33/067; B62D 33/0604
USPC ................................... 296/190.07
See application file for complete search history.

(56) References Cited

U.S. PATENT DOCUMENTS

| | | | | |
|---|---|---|---|---|
| 3,039,557 A * | 6/1962 | Boyce | ................. | B62D 33/067 16/289 |
| 3,380,773 A * | 4/1968 | Sewelin | ............... | B62D 33/067 180/89.14 |
| 3,393,005 A * | 7/1968 | Herrmann | ............ | B60G 99/006 180/89.14 |
| 6,536,837 B2 * | 3/2003 | Ishida | .................. | B62D 21/152 180/89.14 |
| 6,692,052 B1 * | 2/2004 | Sutton | .................... | B62D 21/15 267/276 |
| 2002/0021026 A1 * | 2/2002 | Ishida | .................. | B62D 21/152 296/190.08 |
| 2005/0225119 A1 * | 10/2005 | Bollinger | ............... | B62D 21/02 296/190.07 |
| 2006/0261639 A1 * | 11/2006 | Biasiotto | ............ | B62D 33/0604 296/190.07 |
| 2007/0273120 A1 * | 11/2007 | Fischer | ................ | B62D 33/067 280/124.116 |

(Continued)

FOREIGN PATENT DOCUMENTS

JP    05-022276 U    3/1993
JP    2794511 B2    6/1998

(Continued)

*Primary Examiner* — Gregory Blankenship
(74) *Attorney, Agent, or Firm* — McDermott Will & Emery LLP (57) ABSTRACT

The present disclosure relates to a structure for mounting an upper cabin suspension bracket, the structure configured to connect the upper cabin suspension bracket to a main sill front, wherein an upper cabin suspension bracket mount member for mounting the upper cabin suspension bracket is fixed to integrally form a closed curved surface from the bottom of the main sill front to a front side of a dash member.

6 Claims, 9 Drawing Sheets

(56) References Cited

U.S. PATENT DOCUMENTS

| | | | | |
|---|---|---|---|---|
| 2010/0060033 A1* | 3/2010 | Miura | ............... | B62D 33/067 296/190.05 |
| 2011/0057478 A1* | 3/2011 | Van der Knaap | .... | B60G 99/008 296/190.07 |
| 2016/0121939 A1* | 5/2016 | Choi | ............... | B62D 33/067 296/190.07 |

FOREIGN PATENT DOCUMENTS

| JP | 11-157469 A | 6/1999 |
|---|---|---|
| JP | 11-170942 A | 6/1999 |
| JP | 2001-341666 A | 12/2001 |
| JP | 2004-161036 A | 6/2004 |
| JP | 2008-162377 A | 7/2008 |

* cited by examiner

[ B-B CROSS-SECTIONAL VIEW ]

STRUCTURE FOR MOUNTING FRONT CABIN IN TRUCK

CROSS-REFERENCE TO RELATED APPLICATION

This application claims under 35 U.S.C. §119(a) the benefit of priority to Korean Patent Application No. 10-2014-0152827, filed on Nov. 5, 2014, the entire content of which is incorporated herein by reference.

TECHNICAL FIELD

The present disclosure relates to a structure for mounting a front cabin in a medium-sized truck. More particularly, it relates to a structure for mounting a front cabin in a medium-sized trucks that has a structure designed to increase rigidity by preventing stress concentration at a mounting bracket installation portion and to decrease the overall weight.

BACKGROUND

Figure 1:
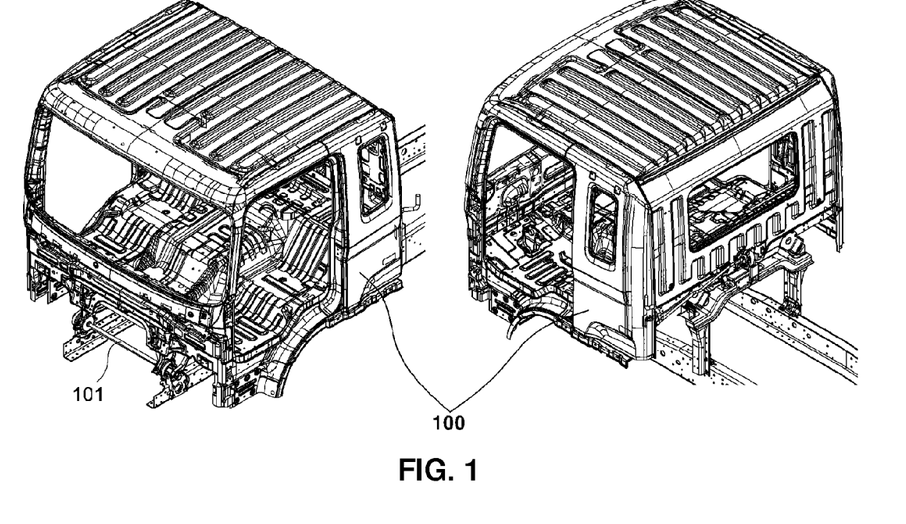
FIG. 1 is a schematic perspective view illustrating an upper cabin suspension bracket mounting structure in medium-sized trucks in the related art.

At present, a 5-ton medium-sized truck has a structure in which the connection of a front cabin 100 to a chassis frame is supported at two front portions and two rear portions as schematically illustrated in FIG. 1. Two front portions are provided around a hinge shaft 101 so that the front cabin 100 is tilted and connected to a rubber absorbing structure by an upper cabin hinge bracket and two rear portions are supported on rubber and configured to be opened at the time of tilting the cabin while being connected with a latch by installing a striker at a center portion.

Figure 2:
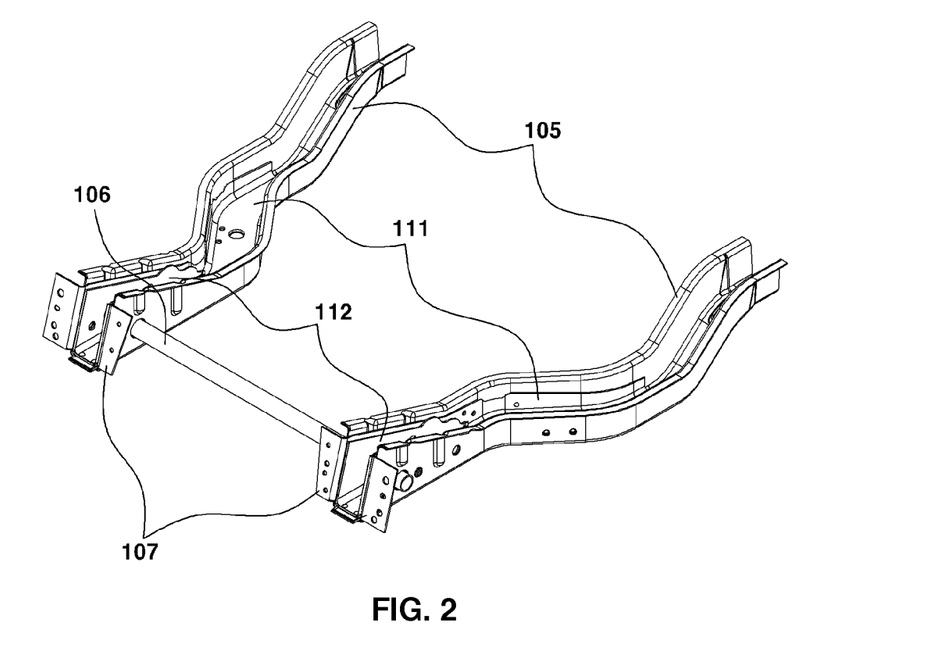
FIG. 2 is a perspective view of a main sill front in the upper cabin suspension bracket mounting structure of FIG. 1.
Figure 3:
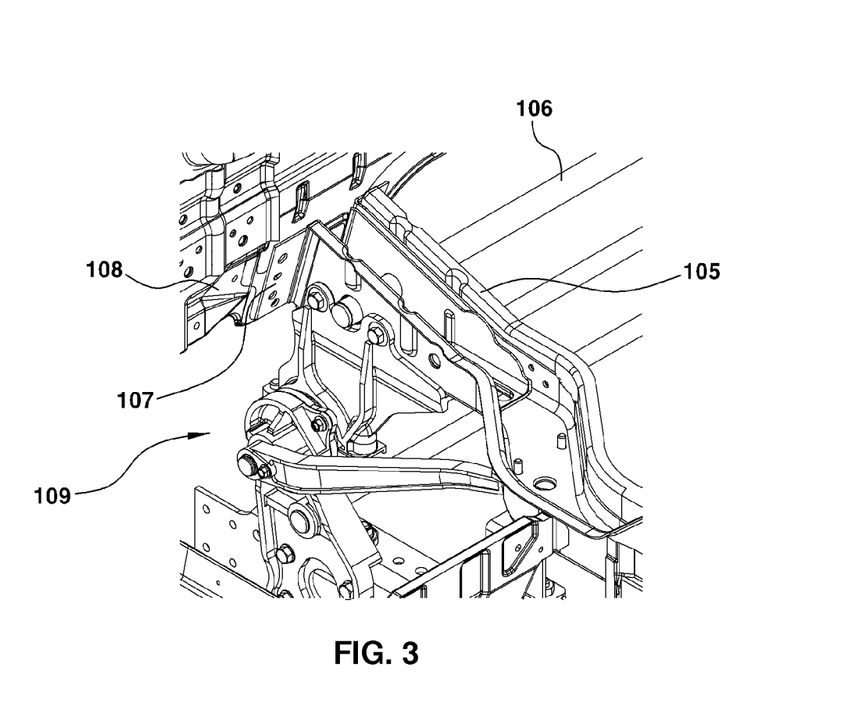
FIG. 3 is a perspective view of a state in which the upper cabin suspension bracket mounting structure is mounted on the main sill front, which is viewed from the bottom surface.

In a cabin mount structure for a medium-sized truck in the related art, as illustrated in FIGS. 2 and 3, two curved manufactured main sill fronts 105 are connected with a cross pipe 106 to be reinforced, and a flange 107 is formed at a front end of the main sill front, a dash member 108 is welded to the flange, and an upper bracket 109 is fixed onto the bottom of the main sill front. Reference numeral 110 represents a hinge support and reference numeral 112 is a hinge reinforcement member.

Figure 4:
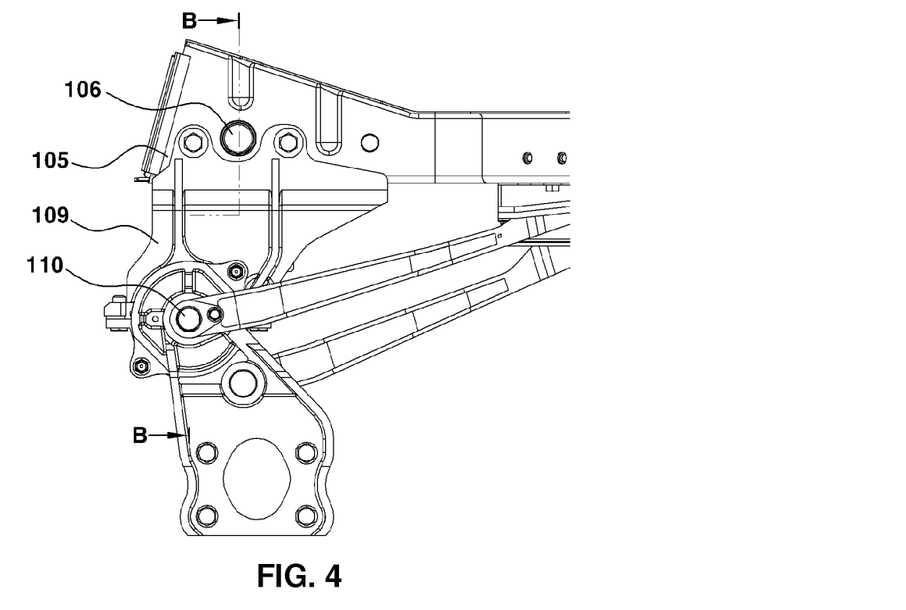
FIG. 4 is a side view of the state in which the upper cabin suspension bracket mounting structure is mounted on the main sill front in FIG. 3.
Figure 5:
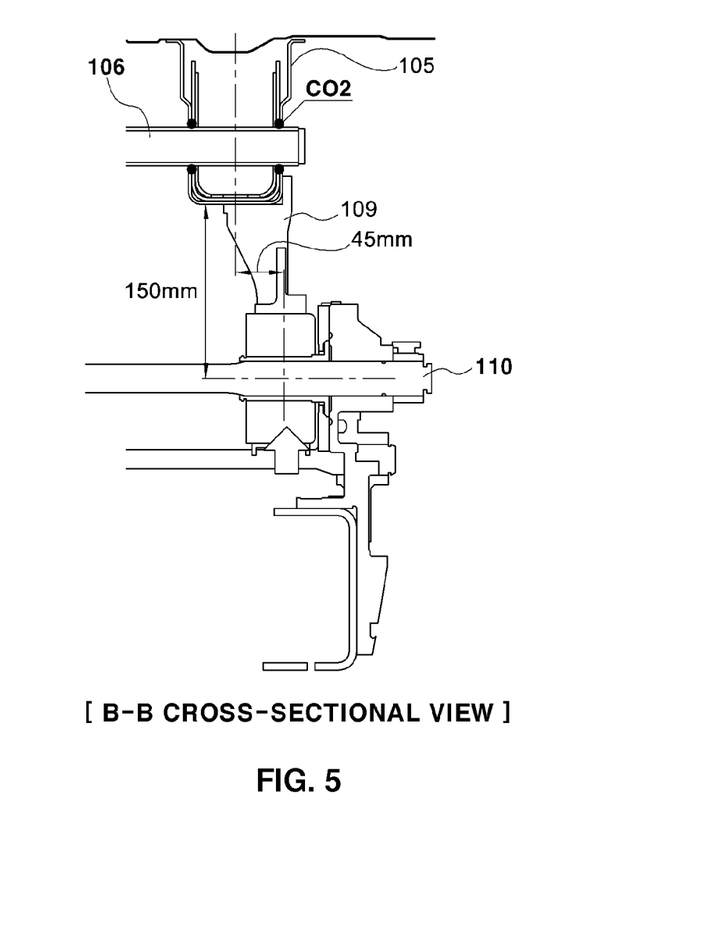
FIG. 5 is a cross-sectional view taken along line B-B of FIG. 4.

In the cabin mount structure in the related art, as illustrated in FIGS. 4 and 5, the positions of a center portion on the bottom of the main sill front 105 for supporting a cabin mount and an upper bracket 109 mounted on a cabin hinge shaft 110 are eccentric to each other by 45 mm and a distance between the hinge shaft 110 and the main sill front 105 is as large as 150 mm, and as a result, a torsion load during driving is large.

The bottom of the main sill front 105 on which the cabin mount is installed and the dash member 108 are disconnected and vulnerable to the torsion load, and an increase in reinforcement is therefore required due to stress concentration and, to this end, the size of a reinforcement member must be increased and the cross pipe 106 is additionally needed, and as a result, a weight and manufacturing cost are increased and the cross pipe is positioned in front of an engine, and as a result, there is a problem that there are increased limitations in the manner of deploying the engine.

In one example of the related art of the cabin mount structure of the medium sized truck, a cap over truck structure is configured in such a manner that a cap mount bracket includes a hinge portion and a front portion and the hinge portion rotatably connects a front end of a chassis frame to support a cap downward.

In another example, existing art discloses a cap front mount bracket structure in which a bracket portion of a front mount bracket structure and a bracket support portion fixed thereto are fixed to the chassis frame.

The above information disclosed in this Background section is only for the enhancement of understanding of the background of the disclosure and therefore it may include information that does not form the prior art that is already known in this country to a person of ordinary skill in the art

SUMMARY

The present disclosure has been made in an effort to solve problems associated with the front cabin mount structure of a medium-sized truck in the related art and the present disclosure provides a structure for mounting a front cabin in medium-sized trucks, in which the front cabin has an enhanced structure in which rigidity is increased and weight is decreased, providing a structure in which a mounting portion distributes and supports a load by configuring the mount portion of an upper cabin suspension bracket having a closed curved surface on a front surface of a dash member and a lower part of a main sill front.

In one aspect, the present inventive concept provides a structure for mounting an upper cabin suspension bracket, which fixes an upper cabin suspension bracket to a main sill front, in which an upper cabin suspension bracket mount portion for mounting an upper cabin suspension bracket is fixed to consecutively integrally form a closed curved surface to a front side of a dash member from the bottom of the main sill front to distribute and support a load.

In an exemplary embodiment, in a structure for mounting an upper cabin suspension bracket, the structure is configured to connect the upper cabin suspension bracket to a main sill front, wherein an upper cabin suspension bracket mount member for mounting the upper cabin suspension bracket is fixed to integrally form a closed curved surface from the bottom of the main sill front to a front side of a dash member.

The upper cabin suspension bracket mount member may comprise a lower mount portion mounted on the bottom of the main sill front, a closed curved surface portion curved to the front side of the dash member from the lower mount portion, and a front mount portion configured to be attached to the front side of the dash member while covering a front end of the main sill front, wherein the upper cabin suspension bracket is integrally formed to be inclined downward with respect to a front side of the closed curved surface portion from the front mount portion.

The upper cabin suspension bracket may be integrally formed to be inclined downward with respect to a front side of the closed curved portion from the front mount portion.

The lower mount portion may be configured to be attached to a central line of the bottom of the main sill front so as not to be eccentric to the main sill front.

Flanges may be disposed at both sides of the front mount portion, wherein the flanges are configured to be attached to the dash member.

The closed curved surface portion may be integrally formed between the lower mount portion configured to be attached to the bottom of the main sill front and the front portion joined to the dash member.

The structure of claim 2, further comprising a hinge support disposed on a front side of the main sill front and a reinforcement member configured to be mounted over a rear end portion of the hinge support, wherein the main sill front has a linear shape.

According to the upper cabin suspension bracket mounting structure, the cross pipe used in the main sill front in the related art is not adopted, and as a result, engine layout setting flexibility is increased.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

The above and other features of the inventive concept are discussed infra.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present inventive concept, and wherein.

It should be understood that the appended drawings are not necessarily to scale, presenting a somewhat simplified representation of various preferred features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present inventive concept throughout the several figures of the drawing.

DETAILED DESCRIPTION

Hereinafter reference will now be made in detail to various embodiments of the present inventive concept, examples of which are illustrated in the accompanying drawings and described below. While the inventive concept will be described in conjunction with exemplary embodiments, it will be understood that present description is not intended to limit the inventive concept to those exemplary embodiments. On the contrary, the inventive concept is intended to cover not only the exemplary embodiments, but also various alternatives, modifications, equivalents and other embodiments, which may be included within the spirit and scope of the inventive concept as defined by the appended claims.

Hereinafter, the present inventive concept will be described in more detail with reference to the accompanying drawings illustrating a cabin mount structure of a medium-sized truck according to an embodiment of the present inventive concept.

Figure 6:
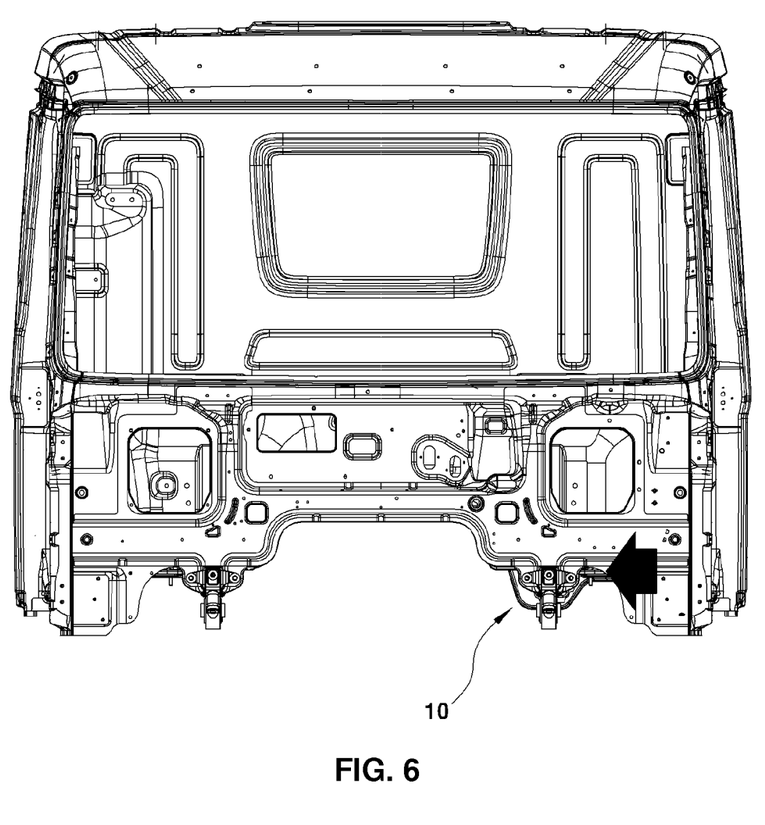
FIG. 6 is a front view of a truck adopting a cabin mounting structure according to the present inventive concept.
Figure 7:
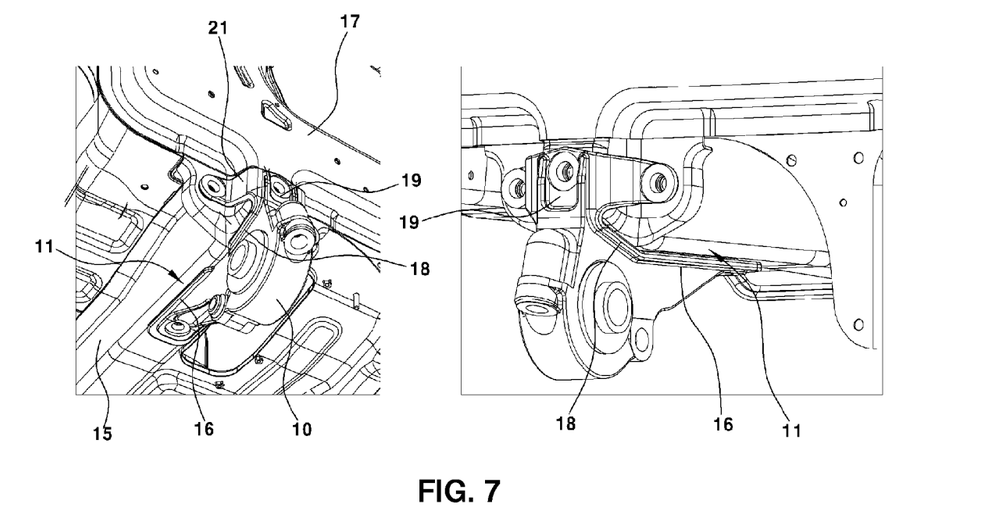
FIG. 7 is a bottom perspective view illustrating the cabin mounting structure according to the present inventive concept of FIG. 6.
Figure 8:
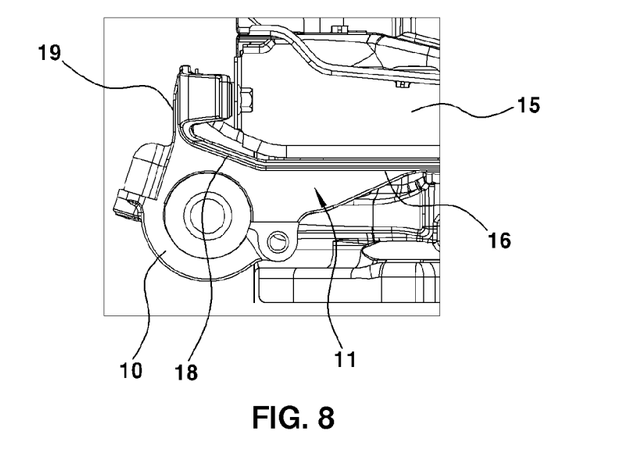
FIG. 8 is a side view illustrating the cabin mounting structure of FIG. 7.

As illustrated in FIGS. 6- to 10, the upper cabin suspension bracket 10 of a medium-sized truck according to the present inventive concept is mounted to form a closed curved surface to a front side of a dash member 17 from the bottom of a main sill front 15 to distribute and support a load.

To this end, a mount portion 11 of the upper cabin suspension bracket 10 consecutively integrally includes a lower mount portion 16 mounted on the bottom of the main sill front 15, a closed curved surface portion 18 curved upward to the front side of the dash member 17 from the lower mount portion 16, and a front mount portion 19 joined to the front side of the dash member while covering a front end of the main sill front. The upper cabin suspension bracket 10 is integrally formed to be inclined downward with respect to the front side of the closed curved portion 18 and the lower mount portion 16 of the mount portion 11.

Figure 9:
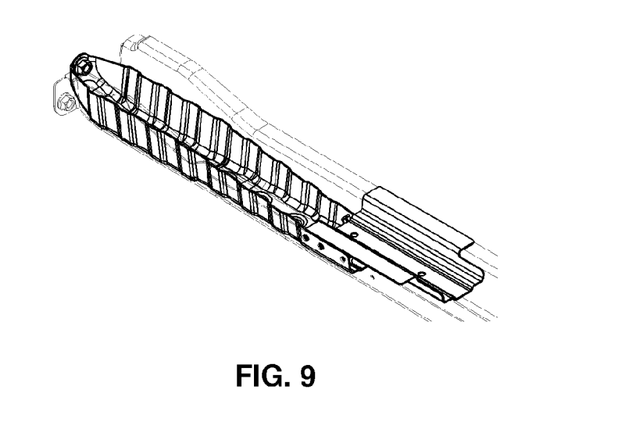
FIG. 9 is a perspective view of a main sill front on which an upper cabin suspension bracket of the cabin mounting structure is mounted according to the present inventive concept.
Figure 10:
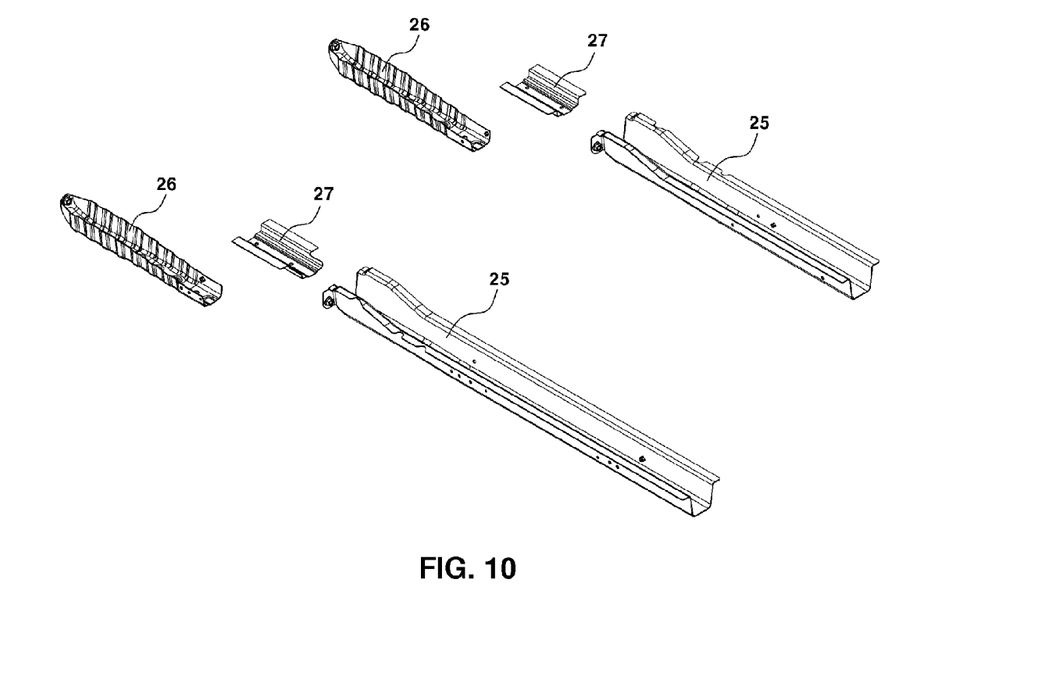
FIG. 10 is an exploded perspective view of the main sill front of FIG. 9.

Flanges 21 are bent at both sides of the front mount portion 19 and the flanges 21 are joined to the dash member 17 by a fastening means such as a bolt.

The lower mount portion 16 is fixed onto the bottom of the main sill front 15 on the same vertical central line so as not to be eccentric to the main sill front, and as a result, the lower mount portion 16 is not eccentric and a distance between the cabin suspension bracket and the bottom of the main sill front is decreased, and as a result, a torsion load generated during driving is decreased as compared with a case in which the bracket mount is fixed at an eccentric location.

In the upper cabin suspension bracket mount portion according to the present inventive concept, the bottom of the main sill front 15 and the front portion 19 joined to the dash member 17 are integrally configured by the closed curved surface portion 18, and as a result, the upper cabin suspension bracket mount portion 11 distributes and supports a load that acts on the bracket at each portion, thereby preventing a stress concentration phenomenon.

Therefore, as compared with the case in which the upper cabin suspension bracket mount 10 in the related art is fixed to only the bottom of the end of the main sill front 15, and as a result, the load concentrates on a discontinuous section when a twisting load is generated, load support rigidity of the bracket mount portion of the present inventive concept is significantly improved without increasing the weight needed for rigidity reinforcement because separate rigidity reinforcement is not required as it is in the related art, and as a result, weight lightening may be achieved.

Since the main sill front 15 on which the upper cabin suspension bracket mount 11 is mounted is formed in a linear shape and may be easily fabricated by a thicker material than the curved main sill front in the related art, the rigidity may be increased, and as a result, a hinge support 26 deployed on the top of the front side of a main sill 25 and a reinforcement member 27 that is mounted over a rear end portion of the hinge support 26 and the main sill front 15 may be mounted with a weight lower than those in the related art, and as a result, a rigidity of a joining portion of the main sill front and the hinge support may be increased.

As described above, since a cross pipe member connected for reinforcement between the main sill fronts deployed spaced apart from each other at both sides in the related art is not necessary due to the enhanced main sill front structure according to the present inventive concept, there is increased flexibility in setting an engine layout and the weight is also decreased, and as a result, weight lightening may be achieved.

Figure 11:
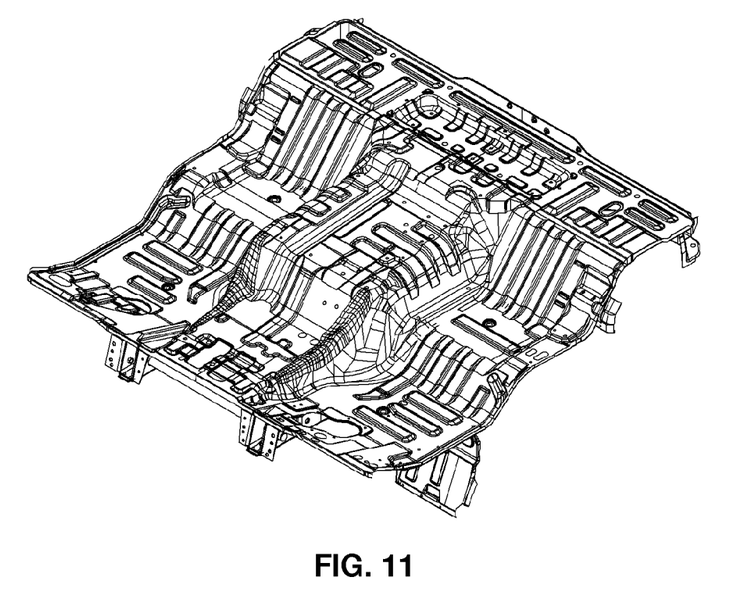
FIGS. 11 and 12 are a floor perspective view adopting the cabin mounting structure in the related art and a photograph illustrating maximum stress which is generated at both front sill ends.
Figure 12:
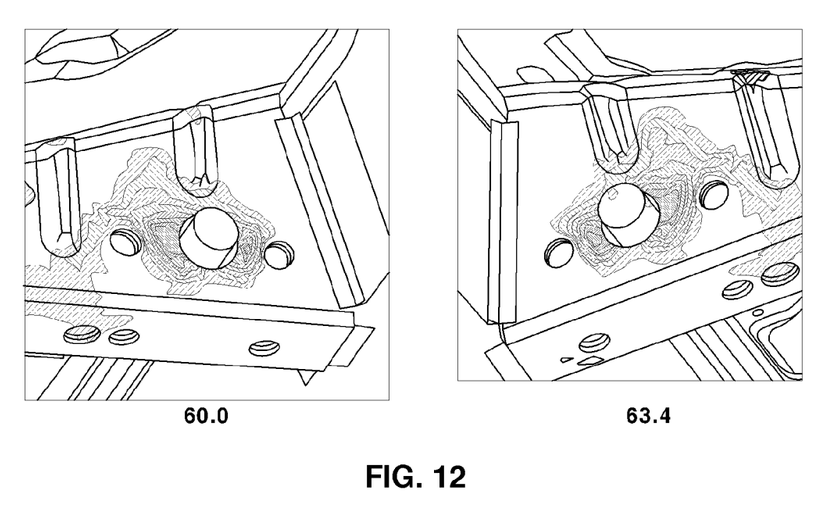

As a result of a stress analysis test of a floor having the front cabin mounting structure, maximum stress is generated around a cross pipe in left and right main sill front as illustrated in FIG. 12 in a floor illustrated in FIG. 11, which has the front cabin mounting structure in the related art.

Figure 13:
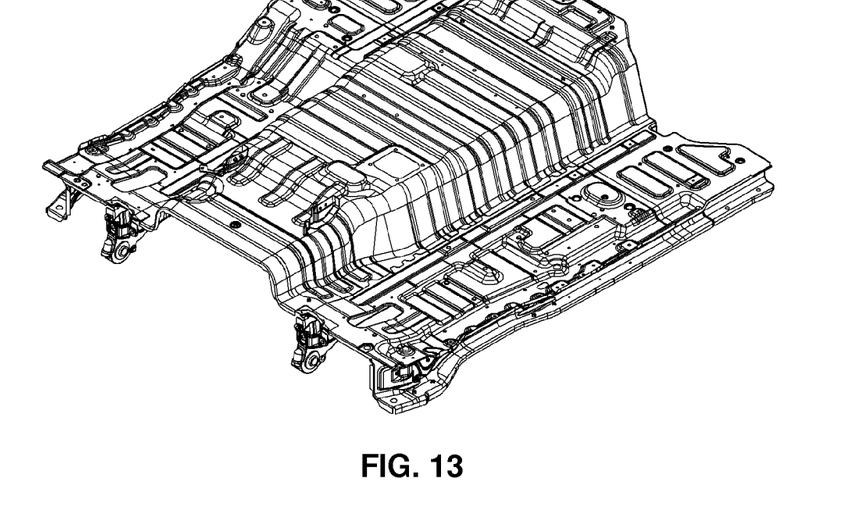
FIGS. 13 and 14 are a floor perspective view adopting the cabin mounting structure of the present inventive concept and a photograph illustrating a part where the maximum stress is generated.
Figure 14:
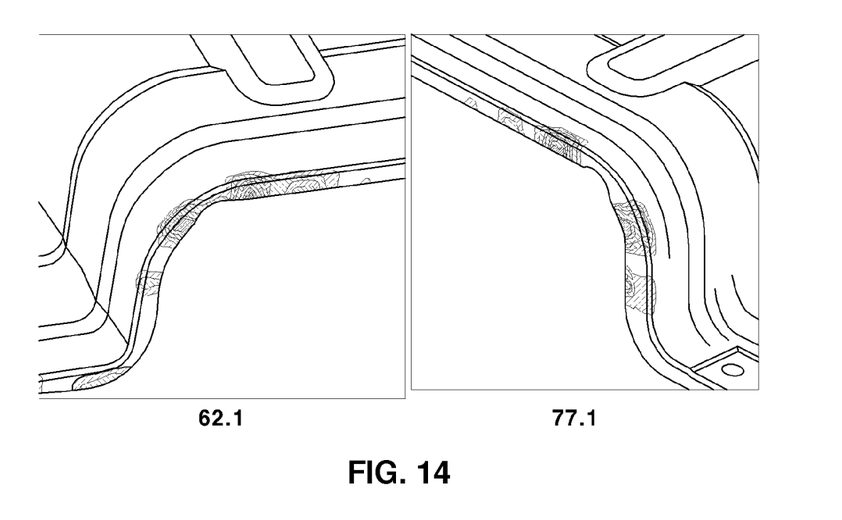

The maximum stress is generated at a corner portion in a floor illustrated in FIG. 13, which has a front cabin of the present inventive concept and it can be seen that the maximum stress generated in the floor adopting the mounting structure of the present inventive concept is reduced as compared with the maximum stress generated in the floor adopting the mounting structure in the related art as listed in Table 1 given below.

TABLE 1

|  | Floor adopting mounting structure of present inventive concept | Floor adopting mounting structure in related art |
| --- | --- | --- |
| Maximum stress (MPa) | (Left/Right corner) 77.1 | (Left/Right cornerside) 63.4 |
| Strength index | 2.18 | 2.65 |
| Yield strength | 168 | 168 |

Table 2 given below lists that a weight of each part of the main sill front structure adopting the cabin mounting bracket in the related art and a weight of each part of the main sill front structure adopting the cabin mounting bracket of the present inventive concept are compared with each other and it can be verified that the weight of the main sill front structure in the present inventive concept is smaller than that in the related art by 7 kg in overall, and as a result, the weight of the main sill front is lighter when adopting the bracket mounting structure of the present inventive concept.

TABLE 2

| | Each part of main sill front | Main sill front in related art (A)(kg) | Main sill front of present invention (B)(kg) | Difference (B − A)(kg) |
| --- | --- | --- | --- | --- |
| 1 | Main sill front | 10.5 | 11.8 | 1.3 |
| 2 | Hinge support | 7.8 | 3.6 | −4.2 |
| 3 | Hinge reinforcement member | 3.5 | 1.2 | −2.3 |
| 4 | Cross pipe | 1.8 | — | −1.8 |
| 5 | H/W | 0.4 | 0.4 | 0 |
| | Total | 24.0 | 17.0 | −7.0 |

The cabin mounting structure of the present inventive concept can be used to tiltably support the cabin in the medium-sized truck with decreased weight and increased rigidity.

The inventive concept has been described in detail with reference to exemplary embodiments thereof. However, it will be appreciated by those skilled in the art that changes may be made in these embodiments without departing from the principles and spirit of the inventive concept, the scope of which is defined in the appended claims and their equivalents.

What is claimed is:

1. A structure for mounting an upper cabin suspension bracket, the structure configured to connect the upper cabin suspension bracket to a main sill front, wherein an upper cabin suspension bracket mount member for mounting the upper cabin suspension bracket is fixed to integrally form a closed curved surface from the bottom of the main sill front to a front side of a dash member,
   wherein the upper cabin suspension bracket mount member comprises a hinge support disposed on a front side of the main sill front and a reinforcement member mounted over a rear end portion of the hinge support, wherein the main sill front has a linear shape.

2. The structure of claim 1, wherein the upper cabin suspension bracket mount member further comprises:
   a lower mount portion mounted on the bottom of the main sill front,
   a closed curved surface portion curved to the front side of the dash member from the lower mount portion, and
   a front mount portion attached to the front side of the dash member while covering a front end of the main sill front,
   wherein the upper cabin suspension bracket is integrally formed to be inclined downward with respect to a front side of the closed curved surface portion from the front mount portion.

3. The structure of claim 1, wherein the upper cabin suspension bracket is integrally formed to be inclined downward with respect to a front side of the closed curved portion from the front mount portion.

4. The structure of claim 2, wherein the lower mount portion is attached to a central line of the bottom of the main sill front so as not to be eccentric to the main sill front.

5. The structure of claim 2, further comprising flanges disposed at both sides of the front mount portion, wherein the flanges are attached to the dash member.

6. The structure of claim 2, wherein the closed curved surface portion is integrally formed between the lower mount portion attached to the bottom of the main sill front and the front portion joined to the dash member.

* * * * *